United States Patent
Arunachalam et al.

(10) Patent No.: US 10,967,844 B2
(45) Date of Patent: Apr. 6, 2021

(54) CONTROL DEVICE AND METHOD FOR OPERATING AN ELECTROMECHANICAL BRAKE BOOSTER

(71) Applicant: Robert Bosch GmbH, Stuttgart (DE)

(72) Inventors: Vairavan Arunachalam, Tamil Nadu (IN); Manfred Gerdes, Vaihingen/Enz (DE); Markus Weigel, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 16/309,006

(22) PCT Filed: Apr. 12, 2017

(86) PCT No.: PCT/EP2017/058754
§ 371 (c)(1),
(2) Date: Dec. 11, 2018

(87) PCT Pub. No.: WO2017/215812
PCT Pub. Date: Dec. 21, 2017

(65) Prior Publication Data
US 2019/0308602 A1    Oct. 10, 2019

(30) Foreign Application Priority Data
Jun. 15, 2016    (DE) ...................... 10 2016 210 617.1

(51) Int. Cl.
*B60T 13/74*        (2006.01)
*B60T 7/12*         (2006.01)
(Continued)

(52) U.S. Cl.
CPC .............. *B60T 13/745* (2013.01); *B60T 7/12* (2013.01); *B60T 8/72* (2013.01); *B60T 17/18* (2013.01);
(Continued)

(58) Field of Classification Search
CPC . B60T 13/745; B60T 7/12; B60T 8/72; B60T 17/18; B60T 2201/02; B60T 2220/04; B60Y 2400/81
See application file for complete search history.

(56) References Cited

U.S. PATENT DOCUMENTS

2015/0360666 A1    12/2015  Gerdes et al.
2016/0275795 A1*    9/2016  Lippman .................. B60T 7/22

FOREIGN PATENT DOCUMENTS

CN    102207145 A    10/2011
CN    102256842 A    11/2011
(Continued)

OTHER PUBLICATIONS

International Search Report for PCT/EP2017/058754, dated Jul. 25, 2017.

*Primary Examiner* — Alan D Hutchinson
(74) *Attorney, Agent, or Firm* — Norton Rose Fulbright Us LLP; Gerard Messina (57)    ABSTRACT

The invention relates to a control device (10) for at least one electromechanical brake booster of a brake system of a vehicle having an electronics device (32) that is designed to compare a provided sensor signal (38) relating to a differential path (d) between a valve body (12), displaced by a controlled motor, of the electromechanical brake booster and an input rod (14) of the brake system with a specified normal value range, such that, if the sensor signal (38) relating to the differential path (d) lies outside the specified normal value range, the electronics device (32) is in addition designed to define a maximum limit value for a target quantity relating to a target motor torque to be carried out by the motor, at least taking into account the sensor signal (38), in such a way that, at least during a specified time interval after the defining of the maximum limit value, at most an actual motor torque corresponding to the defined maximum limit (Continued)

value can be carried out by the controlled motor. The present invention also relates to an electromechanical brake booster for a brake system of a vehicle, to a brake system for a vehicle, and to a method for operating an electromechanical brake booster of a brake system of a vehicle.

11 Claims, 2 Drawing Sheets

(51) Int. Cl.
    *B60T 8/72*       (2006.01)
    *B60T 17/18*     (2006.01)

(52) U.S. Cl.
    CPC ....... *B60T 2201/02* (2013.01); *B60T 2220/04* (2013.01)

(56) References Cited

FOREIGN PATENT DOCUMENTS

| | | |
|---|---|---|
| CN | 102320292 A | 1/2012 |
| DE | 102007045378 A1 | 4/2009 |
| DE | 102013208672 A1 | 11/2014 |
| DE | 102014211551 A1 | 12/2015 |
| JP | 2008535711 A | 9/2008 |
| WO | 2015188958 A1 | 12/2015 |

\* cited by examiner

CONTROL DEVICE AND METHOD FOR OPERATING AN ELECTROMECHANICAL BRAKE BOOSTER

The present invention relates to a control device for at least one electromechanical brake booster of a brake system of a vehicle. The present invention also relates to an electromechanical brake booster for a brake system of a vehicle and to a brake system for a vehicle. In addition, the present invention relates to a method for operating an electromechanical brake booster of a brake system of a vehicle.

BACKGROUND OF THE INVENTION

In DE 10 2014 211 551 A1, an electromechanical brake booster and a method for operating an electromechanical brake booster are described. The electromechanical brake booster has a valve body that can be displaced by its motor and has an input rod, such that the valve body, displaced in a braking direction in a displacement movement, can be displaced up to a differential path that is equal to a limit differential path relative to the input rod, and the input rod is subsequently capable of being displaced in a co-displacement movement in the braking direction. However, if a retaining force that is above a specified threshold value counteracts the co-displacement movement of the input rod in the braking direction, then at least one buffer element situated on the input rod and/or on the valve body is deformed in such a way that the differential path is increased above the braking differential path. As soon as the differential path exceeds the braking differential path, the operation of the motor of the electromechanical brake booster is interrupted for at least a specified time interval.

DISCLOSURE OF THE INVENTION

The present invention provides a control device for at least one electromechanical brake booster of a brake system of a vehicle having the features of Claim 1, an electromechanical brake booster for a brake system of a vehicle having the features of Claim 3, a brake system for a vehicle having the features of Claim 6, and a method for operating an electromechanical brake booster of a brake system of a vehicle having the features of Claim 7.

Advantages of the Invention

In comparison with conventional possibilities for recognizing an already-occurred blockage of a brake actuating element (such as a pedal blockage), in particular caused by a driver's foot or some other foreign object within a displacement path/displacement volume of the brake actuating element carried along by the electromechanical brake booster, the present invention has the advantage that a reaction can take place already upon suspicion that a blockage of the brake actuating element may soon occur. In particular, as soon as such a suspicion is present, via the difference path-dependent limitation of the actual torque of the motor of the electromechanical brake booster it can already be ensured that further operation of the motor does not cause injury to the driver's foot or damage to the braking object. Therefore, the present invention also does not require an immediate interruption of the operation of the electromechanical brake booster, but rather permits at least a temporary further operation of the electromechanical brake booster in a mode adapted to the existing suspicion. Thus, by the present invention the electromechanical brake booster can be used longer without an associated risk of injury to the driver's foot or damage to the foreign object.

In particular, the present invention provides an improved safety standard in particular for automated/autonomous brakings (i.e. brakings requested by an automatic speed control system of the vehicle without an actuation of the brake actuating element by the driver) carried out by the electromechanical brake booster. The present invention is also particularly suitable for electromechanical brake boosters that are designed to bring about a brake pressure buildup speed that is significantly greater than in the existing art. Although in such electromechanical brake boosters it is conventionally more difficult to timely limit the forces that occur in the case of a blockage of the brake actuating element, this is possible using the procedure of the present invention. In addition, the present invention makes it possible to keep the risk of injury or damage low as soon as there is a suspicion, using a limitation of the actual motor torque of the corresponding electromechanical brake booster, while at the same time continuing to operate the electromechanical brake booster.

Using the present invention, the conventional redundant sensing for recognizing an already-blocked brake actuating element can be omitted. The conventional redundant sensing is based on a differential path sensor system and an estimated supporting force applied by the electromechanical brake booster through its operation. However, a comparison of the support force with acting spring forces and with a pressure force that is present generally requires the pressure force to be ascertained without a time delay. However, in most cases this is not possible, so that a pressure sensor signal relating to the pressure force is available only with a time delay, which significantly delays a recognition of a blocking of the brake actuating element based on the comparison of the supporting force. This conventional disadvantage can however be circumvented by the present invention.

In an advantageous specific embodiment of the control device, if the sensor signal is outside the specified normal value range, the electronics device is designed to define the maximum limit value for the target quantity taking into account the sensor signal in such a way that the maximum limit value for the target quantity decreases in relation to an increase of a deviation of the differential path from the specified normal value range.

The advantages described above are also ensured in an electromechanical brake booster for a brake system of a vehicle having the corresponding control device, the electromechanical brake booster also being capable of being equipped with the valve body, which is displaceable in a displacement movement in a braking direction by the motor controlled by the control device, and with the input rod, which is attached to the valve body in such a way that the valve body set into the displacement movement in the braking direction is displaceable up to a differential path between the input rod and the valve body that is equal to a specified limit differential path in relation to the input rod, and subsequently the input rod is displaceable by the valve body, set into the displacement movement in the braking direction, in a co-displacement movement as long as at most a retaining force that is below a specified threshold value counteracts the co-displacement movement of the input rod in the braking direction.

Preferably, at least one buffer element or spring element is situated on the input rod and/or on the valve body in such a way that if during the displacement movement of the valve body in the braking direction a retaining force above the specified threshold value counteracts the co-displacement movement of the input rod in the braking direction, the differential path between the valve body set into the displacement movement in the braking direction and the input rod can be increased above the specified limit differential path via a distortion of the at least one buffer element or spring element. For example, the at least one buffer element or spring element can include at least one compressive element that is situated on at least one impact surface, capable of being contacted by the input rod, of the valve body, and/or on at least one impact surface, capable of being contacted by the valve body, of the input rod.

A brake system for a vehicle having such a control device or having a corresponding electromechanical brake booster also offers the advantages described above.

In addition, the advantages are also ensured given the carrying out of a corresponding method for operating an electromechanical brake booster of a brake system of a vehicle.

BRIEF DESCRIPTION OF THE DRAWINGS

Further features and advantages of the present invention are explained in the following on the basis of the Figures.

SPECIFIC EMBODIMENTS OF THE INVENTION

Figure 1:
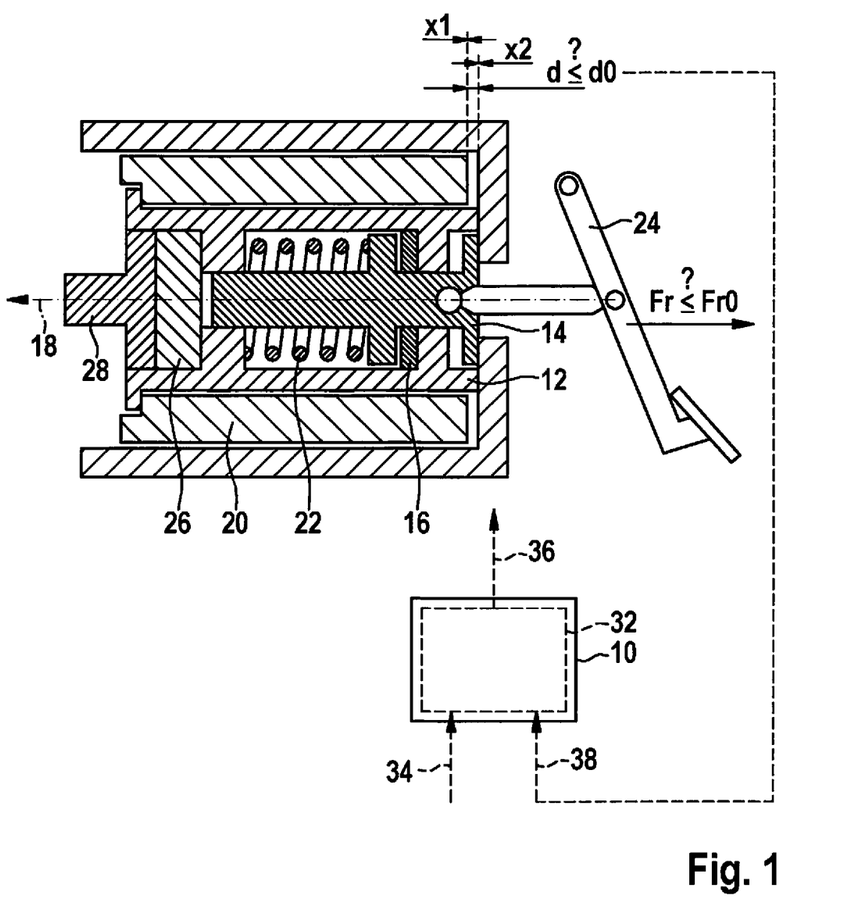
FIG. 1 shows a schematic representation of a specific embodiment of the control device and of the electromechanical brake booster equipped therewith.

FIG. 1 shows schematic representations of a specific embodiment of the control device and of the electromechanical brake booster equipped therewith.

Control device 10, shown schematically in FIG. 1, or the electromechanical brake booster equipped therewith, are not limited in their use to a particular type of brake system. Moreover, it is to be noted that a brake system equipped with control device 10 or with the corresponding electromechanical brake booster may be used in a large number of different vehicle types/motor vehicle types.

As an example, in the specific embodiment of FIG. 1, control device 10 is integrated in the electromechanical brake booster as a control electronics unit. As an alternative to this, however, control device 10 may also be situated externally to the electromechanical brake booster. In both cases, control device 10 (as an advantageous development) can also be designed for the controlling of further components of the brake system equipped with the electromechanical brake booster.

The electromechanical brake booster includes (in addition to control device 10) a valve body 12 and an input rod 14. In the specific embodiment of FIG. 1, valve body 12 has a through-going bore having an (annular) expansion. An advantageous attachment of input rod 14 on valve body 12 is realized in that input rod 14 extends at least partly through the bore. In particular, a bonding area of input rod 14 extends into the (annular) expansion. The bonding area of input rod 14 can also be designated an (annular) protrusion on input rod 14, or a key. The advantageous attachment of input rod 14 on valve body 12 can also be described as a mounting of input rod 14 in valve body 12. The bonding/key ensures that the bonding area of input rod 14 can move inside valve body 12 only within certain limits set by the (annular) expansion. Moreover, the electromechanical brake booster shown in FIG. 1 also has at least one buffer element and/or spring element 16 situated on input rod 14 and/or on booster body 12, and whose functioning is described in more detail below.

Valve body 12 can be set at least into a displacement movement in a braking direction 18 through the operation of a motor (not shown) of the electromechanical brake booster. This can also be described by saying that valve body 12 is capable of being displaced, by a booster force exerted on the body by the motor, from its (forceless) initial position by a booster path x1 in braking direction 18. For example, in the specific embodiment described here, valve body 12 is connected to the motor, via at least one boost body 20, in such a way that valve body 12 can be set into the displacement movement in braking direction 18 by a movement of booster body 20 brought about by the operation of the motor. As an alternative or supplement to boost body 20, valve body 12 can also be connected to the motor via a threading (not shown).

In the specific embodiment described here, input rod 14 is supported on valve body 12 via a reset spring 22. However, it is to be noted that the equipping of the electromechanical brake booster with reset spring 22 is merely optional. As shown in FIG. 1, a brake actuating element 24, such as a brake pedal 24, can be connected or is connected to input rod 14. Through an actuation of brake actuating element 24 by a driver, a driver's braking force can be transmitted to input rod 14. Through the transmitted driver's braking force, input rod 14 can be displaced from its (forceless) initial position by an input rod path x2.

In the depicted specific embodiment, input rod 14 and valve body 12 each contact a first side of a reaction plate 26. An output rod 28 (shown only partially) is situated on a second side, oriented opposite the first side, of reaction plate 26. Output rod 28 is capable of being displaced, by the driver's braking force transmitted thereto via input rod 14 and/or by the booster force of the motor of the electromechanical brake booster, transmitted thereto via valve body 12, in such a way that a master brake cylinder pressure in at least one master brake cylinder situated on the electromechanical brake booster can be increased. Because, however, the usability of the electromechanical brake booster is not limited to a particular type of master brake cylinder working together therewith, the master brake cylinder is not shown in FIG. 1. Moreover, it is to be noted that the equipping shown in FIG. 1 of the electromechanical brake booster with reaction plate 26 and output rod 28 is to be interpreted only as an example.

FIG. 1 shows a schematic representation of the electromechanical brake booster of FIG. 1 while the motor is in a deactivated state and while brake actuating element 24 is in its initial position, or while brake actuating element 24 is not being actuated by the driver. This can also be described as saying that the driver's braking force exerted on input rod 14 is equal to zero, and the booster force exerted on valve body 12 is equal to zero.

From the state shown in FIG. 1, the electromechanical brake booster can be activated for an automated/autonomous braking. Automatic/autonomous braking is to be understood as a process in which a brake pressure is built up in at least one wheel brake cylinder of the brake system equipped with the electromechanical brake booster without an actuation of brake actuating element 24 by the driver. For example, the automatic/autonomous braking can be triggered by an automatic speed control system. The automatic speed control system can for example be understood as a driver assistance system (e.g. an ACC or Adaptive Cruise Control system) and/or an emergency braking system (such as an AEB or Autonomous Emergency Braking system). In particular, the electromechanical brake booster can be designed such that a force/energy required to carry out the automatic/autonomous braking can be applied exclusively by the electromechanical brake booster, or by its motor. In this way, it is not necessary to equip the brake system equipped with the electromechanical brake booster with an additional motor device/hydraulic device in order to carry out the automatic/autonomous braking. The multifunctionality of the electromechanical brake booster thus reduces the required constructive space, weight, and production costs of the brake system equipped therewith. Alternatively, however, the electromechanical brake booster can be designed only to boost the automatic/autonomous braking. In this case, the automatic/autonomous braking takes place through an interaction of the electromechanical brake booster with at least one valve of the brake system, at least one transducer device of the brake system such as a motorized plunger device, and/or at least one pump of the brake system.

In order to carry out/boost the automatic/autonomous braking, valve body 12 is set into the displacement movement in braking direction 18 by the operation of the motor. Input rod 14 is attached on valve body 12 in such a way that the valve body 12, displaced (from its initial position) into the displacement movement in braking direction 18 can be displaced up to a differential path d between input rod 14 and valve body 12 that is equal to a limit differential path d0 relative to input rod 14. Differential path d can be understood for example as a differential position of input rod 14 to valve body 12 that can be measured directly in particular by a differential path sensor. (The differential path can for example be defined equal to/via a difference between boost path x1 and input rod path x2, possibly also with a constant.)

As soon as valve body 12 has been displaced by differential path d equal to limit differential path d0, input rod 14 can be set into a co-displacement movement in brake direction 18 by valve body 12 (set into the displacement movement in braking direction 18). Preferably, the co-displacement movement of input rod 14 in braking direction 18 can be carried out while maintaining differential path d equal to limit differential path d0.

The co-displacement of input rod 14 in braking direction 18 (together with valve body 12) however occurs only if at most a retaining force Fr below a specified threshold value Fr0 counteracts the co-displacement movement of input rod 14 in braking direction 18. In most cases, the co-displacement movement of input rod 14 in braking direction 18 brings about a movement of brake actuating element 24 equal/similar to a corresponding actuation of brake actuating element 24 by the driver. Often, the movement of brake actuating element 24 takes place with a high dynamic characteristic. This is specifically the case when there is an automatic/autonomous full braking.

However, it can happen that at least one object, such as a driver's foot, a bottle, and/or a pet, is situated close to brake actuating element 24. Above all, it is possible that the respective object extends at least partly into an intermediate space between brake actuating element 24 and an adjacent vehicle wall. Such a situation usually causes a force directed against the movement of brake actuating element 24. This also causes a retaining force Fr to act on input rod 14, which counteracts the co-displacement movement of input rod 14 in input direction 18 (together with valve body 12). However, as long as no disturbing object is situated at brake actuating element 24, retaining force Fr acting on input rod 14 will as a rule be below the specified threshold Fr0. (For example, retaining force Fr below specified threshold Fr0 may result from friction of input rod 14.)

However, if an object extends into the intermediate gap between brake actuating element 24 and the adjacent vehicle wall component, then beginning with the presence of light contact between brake actuating element 24 and the respective object, a (slightly) increased retaining force Fr will usually occur. Advantageously, threshold value Fr0 specified at the electromechanical brake booster is defined in such a way that the retaining force Fr, occurring starting from the light contact between brake actuating element 24 and the object, is above the specified threshold value Fr0.

However, due to the equipping of the electromechanical brake booster with control device 10 and the at least one buffer element and/or spring element 16, a clamping, squeezing, or hard impact of the object can be reliably prevented. The at least one buffer element and/or spring element 16 ensures that if during the displacement movement of valve body 12 in braking direction 18 a retaining force Fr slightly exceeding the specified threshold value Fr0 counteracts the co-displacement movement of input rod 14 in braking direction 18, differential path d between valve body 12 set into the displacement movement in input direction 18 and input rod 14 can be increased above the specified limit differential path d0 by a deformation of the at least one buffer element and/or spring element 16. For example, for this purpose the at least one buffer element and/or spring element 16 is designed such that the at least one buffer element and/or spring element 16 is deformable from its respective initial shape, starting with a force applied thereto corresponding to threshold value Fr0, such that differential path d can be increased above the limit differential path d0 via a further displacement of valve body 12 relative to input rod 14. Moreover, the at least one buffer element and/or spring element 16 can be designed such that the at least one buffer element and/or spring element 16 remains in its respective initial shape (approximately) despite a force exerted thereon that corresponds to a retaining force Fr that is below the specified threshold value Fr0. Threshold value Fr0 can easily and reliably be set to a desired value through the design of the at least one buffer element and/or spring element 16. For this purpose, the at least one buffer element and/or spring element 16 merely has to be designed such that it is deformable from its initial shape only starting from a force applied thereto that corresponds to the desired threshold value Fr0, whereas a deformation of the at least one buffer element and/or spring element 16, in its initial shape, is (approximately) prevented when there is a lower force.

The increase, triggered at the electromechanical brake booster, of differential path d above specified limit differential path d0 enables a recognition of risk long before a clamping, squeezing, or hard impact of the object. A light contact between brake actuating element 24 and the object already suffices for an early recognition/determination that a risk situation is present with regard to a possible holding back or blocking of input rod 14 (or of brake actuating element 24). Through the early risk recognition, timely measures can be taken to prevent a clamping, squeezing, or hard impact of the object without immediately terminating the automated/autonomous braking that has begun. For this reason, the use of control device 10 prevents unnecessary terminations of automated/autonomous brakings due to incorrectly overestimated danger situations.

Control device 10 includes an electronics device 32 to which a brake specification 34 can be provided relating to a target vehicle deceleration requested by a driver of the vehicle or by the automatic speed control system of the vehicle. In the following, brake specification signal 34 is understood as a signal of the automatic speed control system of the vehicle by which the automatic speed control system requests an automated/autonomous slowing/braking of the vehicle. Control device 10 is advantageously designed in particular for such situations. Using electronics device 32, taking into account brake specification signal 34 a target quantity can be defined relating to a target motor torque that is to be executed by the motor of the electromechanical brake booster. The target quantity can for example be the target motor torque that is to be carried out and/or a target current strength that is to be provided to the electromechanical brake booster (which as a rule brings about the desired target motor torque). However, it is to be noted that the examples named here of the target quantity are not to be interpreted as limiting. Moreover, at least one control signal 36 can be supplied to the motor of the electromechanical brake booster in such a way that an actual motor torque corresponding to the defined target quantity can be carried out by the controlled motor.

Moreover, electronics device 32 is designed to compare a provided sensor signal 38, relating to the difference path d between valve body 12 displaced by the controlled motor and input rod 14, with a specified normal value range. In particular, the normal value range can be a value range limited by limit differential path d0, so that for example negative differential paths d smaller than negative limit differential path d0 or positive differential paths d greater than positive limit differential path d0 lie outside the specified normal value range.

If provided sensor signal 38 relating to differential path d is outside the specified normal value range, then electronics device 32 is in addition designed to define a maximum limit value for the target quantity from a value range of at least two values for the maximum limit value, taking into account the provided sensor signal 38 relating to differential path d, in such a way that at least during a specified time interval after the defining of the maximum limit value, the target quantity relating to the target motor torque is at most equal to the defined maximum limit value. In this way (at least during the specified time interval after the defining of the maximum limit value), at most an actual motor torque corresponding to the defined maximum limit value can be carried out by the controlled motor of the electromechanical brake booster.

Via the defining of the maximum limit value for the target quantity as a function of sensor signal 38 (or of differential path d), an early reaction can take place even to a suspicion of a blocking (possibly one that is to occur soon) of brake actuating element 24 without immediately interrupting the already-begun automated/autonomous braking for this purpose. Depending on sensor signal 38/differential path d, the maximum limit value for the target quantity can be defined only in such a limiting fashion that an overreaction to the mere suspicion will not occur. In particular, the maximum limit value for the target quantity can decrease in relation to an increase in a deviation of differential path d from the specified normal value range. While in this way when there is a small suspicion of a blocking (possibly occurring soon) of brake actuating element 24, only extreme motor torques of the motor of the electromechanical brake booster are prevented via the defined maximum limit value for the target quantity and relatively large motor torques of the motor below the maximum limit value for the target quantity continue to be used to bring about the automated/autonomous braking, when there is a strong suspicion of the blocking (possibly occurring soon) of brake actuating element 24 only small motor torques of the motor are permitted that are below the (newly defined) maximum limit value for the target quantity. In this way, hard contact between brake actuating element 24 and the object need not be feared.

Via a reduction of the maximum limit value for the target quantity as a function of sensor signal 38/differential path d (or the deviation of differential path d from the specified normal value range), a time up to the actual occurrence of the blocking of brake actuating element 24 can also be prolonged. In this way, additional time is gained for the recognition that the suspicion of a blocking of brake actuating element 24 is justified. This time can be used to carry out further methods for proving the justification of the suspicion and for making a decision about an actual termination of the automated/autonomous braking. Likewise, a removal of the blocking of brake actuating element 24 can be provided by issuing a warning to the driver during this time.

At the same time, in situations in which there is no suspicion of a blocking of brake actuating element 24, high force dynamic characteristics of the motor of the electromechanical brake booster can be used for fast automated/autonomous pressure buildups. Because, using control device 10, it can be recognized already before a blockage of brake actuating element 24 that there is a plausible suspicion of a damage-relevant blockage of brake actuating element 24, high force dynamic characteristics can be carried out comparatively risk-free by the electromechanical brake booster. The electromechanical brake booster can thus be designed to bring about comparatively high forces without danger.

Control device 10 can also be designed to carry out at least some steps of the method described in the following.

In the specific embodiment of FIG. 1, the at least one buffer element and/or spring element 16 is at least one compressive element 16 situated on at least one impact surface of valve body 12 that can be contacted by input rod 14. As an alternative or as a supplement thereto, the electromechanical brake booster can also have at least one further compressive element situated on an impact surface of input rod 14 that can be contacted by valve body 12. Likewise, the at least one compressive element 16 on valve body 12 and the at least one further compressive element on input rod 14 can also be situated such that the at least one compressive element adhering on valve body 12 and the at least one further compressive element fastened on input rod 14 can impact one another. For example, in the specific embodiment of FIG. 1 the at least one compressive element 16 is made of at least one elastic material such as an elastomer and/or a rubber. The at least one compressive element 16 is thus producible at low cost. At the same time, given such a design of the at least one compressive element 16 threshold value Fr0 can easily be set to a desired value. However, the realization of the at least one compressive element 16 is not limited to a particular elastic material.

Instead of or as a supplement to the realization described above of the at least one buffer element and/or spring element 16, this element can also include at least one (e.g. bonded or enclosed) tensile spring element clamped between input rod 14 and valve body 12. For example, the at least one (bonded or enclosed) tensile spring element can extend from at least one first anchoring point on input rod 14 in the direction towards a side, oriented/capable of being oriented toward the master brake cylinder, of the electromechanical brake booster up to at least one second anchoring point on valve body 12.

Figure 2A:
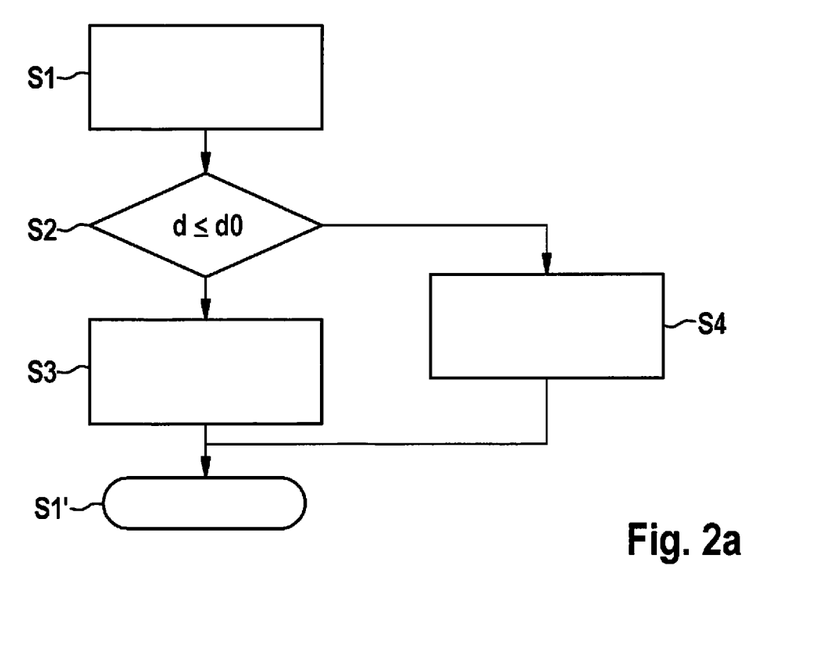
FIGS. 2a and 2b show flow diagrams for the explanation of a specific embodiment of the method for operating an electromechanical brake booster of a brake system of a vehicle.
Figure 2B:
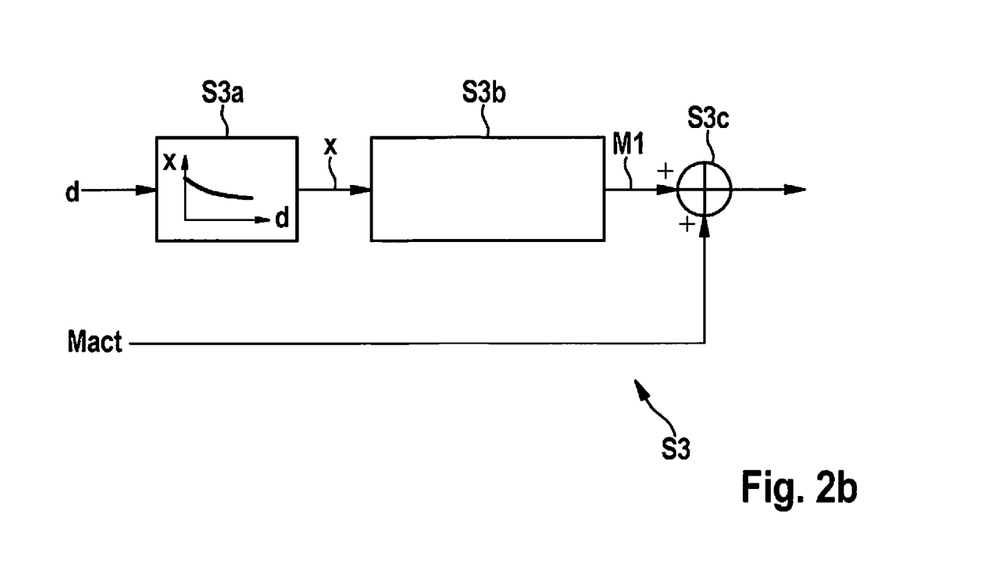

FIGS. 2*a* and 2*b* show flow diagrams explaining a specific embodiment of the method for operating an electromechanical brake booster of a brake system of a vehicle.

The method described below can for example be carried out using the control device described above or the electromechanical brake booster equipped therewith. However, it is to be noted that the realization of the method is not limited to a particular type of electromechanical brake booster, brake system equipped therewith, or vehicle.

In a method step S1, a motor of the electromechanical brake booster is operated, for which purpose a target quantity is defined relating to a target motor torque that is to be carried out by a motor of the electromechanical brake booster. Preferably, an automated/autonomous braking is carried out by the operation of the motor of the electromechanical brake booster. The determination of the target quantity takes place in this case taking into account a target vehicle deceleration requested by an automatic speed control system of the vehicle. Alternatively, the target quantity can also be defined taking into account a target vehicle deceleration requested by a driver of the vehicle. Moreover, in method step S1 the motor of the electromechanical brake booster is controlled in such a way that the motor is operated with an actual motor torque $M_{act}$ that corresponds to the defined target quantity.

Preferably, when method step S1 is carried out a valve body of the electromechanical brake booster is displaced by the operated motor, carrying out a displacement movement in a braking direction relative to an input rod of the brake system until a differential path d between the input rod and the valve body is equal to a specified limit differential path d0. Subsequently, the input rod is set, by the valve body set into the displacement movement in the braking direction, into a co-displacement movement if at most a retaining force below a specified threshold value counteracts the co-displacement movement of the input rod in the braking direction. If, however, during the displacement movement of the valve body in the braking direction a retaining force above the specified threshold value counteracts the co-displacement movement of the input rod in the braking direction, the differential path d between the valve body set into the displacement movement in the braking direction and the input rod is increased above the specified limit differential path d0 via a deformation of at least one buffer element or spring element situated on the input rod and/or on the valve body.

In the method described here, method step S1 is carried out multiple times. In between, a quantity relating to the differential path d between a valve body, displaced by the motor, of the electromechanical brake booster and an input rod is ascertained at least once in a method step S2 (during the controlling of the motor) and is compared with a specified normal value range. This takes place for example by examining whether the (negative) differential path d falls below the specified limit differential path d0.

If the ascertained quantity relating to the differential path d lies outside the specified normal value range, i.e. if the (negative) differential path d falls below limit differential path d0, then a method step S3 is carried out. In method step S3, a maximum limit value for the target quantity is defined. Here, the maximum limit value for the target quantity is defined from a value range of at least two values for the maximum limit value. Here it is expressly noted that the maximum limit value for the target quantity that is defined when there is an ascertained quantity outside the specified normal value range is smaller than a maximum motor torque capable of being carried out by the motor of the electromechanical brake booster, or a corresponding target quantity.

In the specific embodiment of the method described here, method step S3 includes substeps S3*a* through S3*c* (FIG. 2*b*). In a substep S3*a*, an offset value x is defined taking into account the ascertained quantity relating to differential path d. Offset value x can be defined corresponding to a specified (continuous or stepped) function as a function of the ascertained quantity relating to differential path d. In particular, the specified function can decrease (continuously or in stepped fashion) in relation to an increase of a deviation of differential path d from the specified normal value range/limit differential path d0. In a further substep S3*b*, offset value x is converted into a first motor torque M1. (The maximum limit value for the target quantity, taking into account the ascertained quantity, can thus decrease (continuously or in stepped fashion) in relation to an increase in a deviation of the differential path d from the specified normal value range/limit differential path d0.) Subsequently, in a substep S3*c* first motor torque M1 is added to current actual motor torque $M_{act}$, and as a result the maximum limit value for the target quantity is obtained.

When method step S1 is carried out again (or in a method step S1'), at least during a specified time interval (after the defining of the maximum limit value) the target quantity relating to the target motor torque is defined to be at most equal to the defined maximum limit value. Correspondingly, it is also ensured that the motor is operated at most with an actual motor torque $M_{act}$ corresponding to the defined maximum limit value.

In the method described here, a permitted increase of actual motor torque $M_{act}$ of the electromechanical brake booster that becomes smaller as the criticality increases is thus calculated as a function of the current differential path d (as known criticality). This permitted increase of actual motor torque $M_{act}$ can however still enable a reliable carrying out of the automated/autonomous braking.

However, as long as the ascertained quantity relating to differential path d is within the specified normal value range, that is as long as the (negative) differential path d remains greater than or equal to limit differential path d0, no limiting of the target quantity is specified. For example, in a method step S4 a signal can be outputted that the target quantity continues itself to be able to be defined equal to the maximum possible executable motor torque, or equal to the corresponding target quantity.

What is claimed is:

1. A control device for at least one electromechanical brake booster of a brake system of a vehicle, comprising:
an electronics device by which, taking into account a brake specification signal relating to a target vehicle deceleration requested by a driver of the vehicle or by an automatic speed control system of the vehicle, a target quantity is defined relating to a target motor torque that is performable by a motor of the electromechanical brake booster, and at least one control signal is outputtable to the motor of the electromechanical brake booster so that an actual motor torque corresponding to the defined target quantity is performable by the controlled motor;
wherein the electronics device is configured to compare a provided sensor signal relating to a differential path between a valve body, displaced by the controlled motor, of the electromechanical brake booster and an input rod of the brake system with a specified normal value range, and wherein if the sensor signal relating to the differential path lies outside the specified normal value range, the electronics device is further configured to define a maximum limit value for the target quantity from a value range of at least two values for the maximum limit value, at least taking into account the sensor signal so that at least during a specified time interval after the determination of the maximum limit value the target quantity relating to the target motor torque is at most equal to the defined maximum limit value, and an actual motor torque at most corresponding to the defined maximum limit value is performable by the controlled motor.

2. The control device of claim 1, wherein if the sensor signal lies outside the specified normal value range, the electronics device is configured to define the maximum limit value for the target quantity, taking into account the sensor signal so that the maximum limit value for the target quantity decreases in relation to an increase in a deviation of the differential path from the specified normal value range.

3. An electromechanical brake booster for a brake system of a vehicle, comprising:
a control device, including:
an electronics device by which, taking into account a brake specification signal relating to a target vehicle deceleration requested by a driver of the vehicle or by an automatic speed control system of the vehicle, a target quantity is defined relating to a target motor torque that is performable by a motor of the electromechanical brake booster, and at least one control signal is outputtable to the motor of the electromechanical brake booster so that an actual motor torque corresponding to the defined target quantity is performable by the controlled motor;
wherein the electronics device is configured to compare a provided sensor signal relating to a differential path between a valve body, displaced by the controlled motor, of the electromechanical brake booster and an input rod of the brake system with a specified normal value range, and
wherein if the sensor signal relating to the differential path lies outside the specified normal value range, the electronics device is further configured to define a maximum limit value for the target quantity from a value range of at least two values for the maximum limit value, at least taking into account the sensor signal so that at least during a specified time interval after the determination of the maximum limit value the target quantity relating to the target motor torque is at most equal to the defined maximum limit value, and an actual motor torque at most corresponding to the defined maximum limit value is performable by the controlled motor;
wherein the valve body is settable into a displacement movement in a braking direction by the motor controlled by the control device, and
wherein the input rod is attached on the valve body so that the valve body, set into the displacement movement in the braking direction, is displace-able up to a differential path between the input rod and the valve body that is equal to a specified limit differential path in relation to the input rod, and subsequently the input rod is settable into a co-displacement movement by the valve body, which is set into the displacement movement in the braking direction, if at most a retaining force below a specified threshold value counteracts the co-displacement movement of the input rod in the braking direction.

4. The electromechanical brake booster of claim 3, wherein at least one buffer element or spring element is situated on the input rod and/or on the valve body so that if, during the displacement movement of the valve body in the braking direction, a retaining force above the specified threshold value counteracts the co-displacement movement of the input rod in the braking direction, the differential path between the valve body set into the displacement movement in the braking direction and the input rod is increasable above the specified limit differential path via a deformation of the at least one buffer element or spring element.

5. The electromechanical brake booster of claim 4, wherein the at least one buffer element or spring element including at least one compressive element that is situated on at least one impact surface of the valve body that is contactable by the input rod and/or on at least one impact surface of the input rod that is contactable by the valve body.

6. A brake system for a vehicle, comprising:
a control device, including:
an electronics device by which, taking into account a brake specification signal relating to a target vehicle deceleration requested by a driver of the vehicle or by an automatic speed control system of the vehicle, a target quantity is defined relating to a target motor torque that is performable by a motor of the electromechanical brake booster, and at least one control signal is outputtable to the motor of the electromechanical brake booster so that an actual motor torque corresponding to the defined target quantity is performable by the controlled motor;
wherein the electronics device is configured to compare a provided sensor signal relating to a differential path between a valve body, displaced by the controlled motor, of the electromechanical brake booster and an input rod of the brake system with a specified normal value range, and
wherein if the sensor signal relating to the differential path lies outside the specified normal value range, the electronics device is further configured to define a maximum limit value for the target quantity from a value range of at least two values for the maximum limit value, at least taking into account the sensor signal so that at least during a specified time interval after the determination of the maximum limit value the target quantity relating to the target motor torque is at most equal to the defined maximum limit value, and an actual motor torque at most corresponding to the defined maximum limit value is performable by the controlled motor.

7. A method for operating an electromechanical brake booster of a brake system of a vehicle, the method comprising:
defining a target quantity relating to a target motor torque to be carried out by a motor of the electromechanical brake booster, at least taking into account a target vehicle deceleration requested by a driver of the vehicle or by an automatic speed control system of the vehicle;
controlling the motor of the electromechanical brake booster so that the motor is operated with an actual motor torque corresponding to the defined target quantity; and
during the controlling of the motor, at least once a quantity relating to a differential path between a valve body, displaced by the motor, of the electromechanical brake booster and an input rod of the brake system being ascertained and being compared to a specified normal value range;

wherein if the ascertained quantity relating to the differential path lies outside the specified normal value range, a maximum limit value for the target quantity is defined from a value range of at least two values for the maximum limit value, at least taking into account the ascertained quantity relating to the differential path, and wherein at least during a specified time interval after the defining of the maximum limit value the target quantity relating to the target motor torque is at most equal to the defined maximum limit value, and the motor is operated at most with an actual motor torque corresponding to the defined maximum limit value.

8. The method of claim 7, wherein if the ascertained quantity relating to the differential path lies outside the specified normal value range, the maximum limit value for the target quantity is defined, taking into account the ascertained quantity, so that the maximum limit value for the target quantity decreases in relation to an increase in a deviation of the differential path from the specified normal value range.

9. The method of claim 7, wherein the valve body is displaced by the operated motor in a displacement movement in a braking direction relative to the input rod until a differential path between the input rod and the valve body becomes equal to a specified limit differential path, and subsequently the input rod is set into a co-displacement movement by the valve body set into the displacement movement in the braking direction if at most a retaining force that is below a specified threshold value counteracts the co-displacement movement of the input rod in the braking direction.

10. The method of claim 9, wherein, if during the displacement movement of the valve body in the braking direction, a retaining force above the specified threshold value counteracts the co-displacement movement of the input rod in the braking direction, then the differential path between the valve body set into the displacement movement in the braking direction and the input rod is increased above the specified limit differential path via a deformation of at least one buffer element or spring element situated on the input rod and/or on the valve body.

11. A brake system for a vehicle, comprising:
an electromechanical brake booster for a brake system of a vehicle, including:
a control device, including:
an electronics device by which, taking into account a brake specification signal relating to a target vehicle deceleration requested by a driver of the vehicle or by an automatic speed control system of the vehicle, a target quantity is defined relating to a target motor torque that is performable by a motor of the electromechanical brake booster, and at least one control signal is outputtable to the motor of the electromechanical brake booster so that an actual motor torque corresponding to the defined target quantity is performable by the controlled motor;
wherein the electronics device is configured to compare a provided sensor signal relating to a differential path between a valve body, displaced by the controlled motor, of the electromechanical brake booster and an input rod of the brake system with a specified normal value range, and
wherein if the sensor signal relating to the differential path lies outside the specified normal value range, the electronics device is further configured to define a maximum limit value for the target quantity from a value range of at least two values for the maximum limit value, at least taking into account the sensor signal so that at least during a specified time interval after the determination of the maximum limit value the target quantity relating to the target motor torque is at most equal to the defined maximum limit value, and an actual motor torque at most corresponding to the defined maximum limit value is performable by the controlled motor;
wherein the valve body is settable into a displacement movement in a braking direction by the motor controlled by the control device, and
wherein the input rod is attached on the valve body so that the valve body, set into the displacement movement in the braking direction, is displace-able up to a differential path between the input rod and the valve body that is equal to a specified limit differential path in relation to the input rod, and subsequently the input rod is settable into a co-displacement movement by the valve body, which is set into the displacement movement in the braking direction, if at most a retaining force below a specified threshold value counteracts the co-displacement movement of the input rod in the braking direction.

\* \* \* \* \*

UNITED STATES PATENT AND TRADEMARK OFFICE
CERTIFICATE OF CORRECTION

PATENT NO. : 10,967,844 B2
APPLICATION NO. : 16/309006
DATED : April 6, 2021
INVENTOR(S) : Vairavan Arunachalam, Manfred Gerdes and Markus Weigel It is certified that error appears in the above-identified patent and that said Letters Patent is hereby corrected as shown below:

In the Specification

Column 1, Line 1-Column 10, Lines 1-48, should read:

CONTROL DEVICE AND METHOD FOR OPERATING AN ELECTROMECHANICAL BRAKE BOOSTER

FIELD OF THE INVENTION

The present invention relates to a control device for at least one electromechanical brake booster of a brake system of a vehicle. The present invention also relates to an electromechanical brake booster for a brake system of a vehicle and to a brake system for a vehicle. In addition, the present invention relates to a method for operating an electromechanical brake booster of a brake system of a vehicle.

BACKGROUND INFORMATION

In DE 10 2014 211 551 A1, an electromechanical brake booster and a method for operating an electromechanical brake booster are discussed. The electromechanical brake booster has a valve body that can be displaced by its motor and has an input rod, such that the valve body, displaced in a braking direction in a displacement movement, can be displaced up to a differential path that is equal to a limit differential path relative to the input rod, and the input rod is subsequently capable of being displaced in a co-displacement movement in the braking direction. However, if a retaining force that is above a specified threshold value counteracts the co-displacement movement of the input rod in the braking direction, then at least one buffer element situated on the input rod and/or on the valve body is deformed in such a way that the differential path is increased above the braking differential path. As soon as the differential path exceeds the braking differential path, the operation of the motor of the electromechanical brake booster is interrupted for at least a specified time interval.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*

SUMMARY OF THE INVENTION

The present invention provides a control device for at least one electromechanical brake booster of a brake system of a vehicle having the features described herein, an electromechanical brake booster for a brake system of a vehicle having the features described herein, a brake system for a vehicle having the features described herein, and a method for operating an electromechanical brake booster of a brake system of a vehicle having the features described herein.

In comparison with conventional possibilities for recognizing an already-occurred blockage of a brake actuating element (such as a pedal blockage), in particular caused by a driver's foot or some other foreign object within a displacement path/displacement volume of the brake actuating element carried along by the electromechanical brake booster, the present invention has the advantage that a reaction can take place already upon suspicion that a blockage of the brake actuating element may soon occur. In particular, as soon as such a suspicion is present, via the difference path-dependent limitation of the actual torque of the motor of the electromechanical brake booster it can already be ensured that further operation of the motor does not cause injury to the driver's foot or damage to the braking object. Therefore, the present invention also does not require an immediate interruption of the operation of the electromechanical brake booster, but rather permits at least a temporary further operation of the electromechanical brake booster in a mode adapted to the existing suspicion. Thus, by the present invention the electromechanical brake booster can be used longer without an associated risk of injury to the driver's foot or damage to the foreign object.

In particular, the present invention provides an improved safety standard in particular for automated/autonomous brakings (i.e. brakings requested by an automatic speed control system of the vehicle without an actuation of the brake actuating element by the driver) carried out by the electromechanical brake booster. The present invention is also particularly suitable for electromechanical brake boosters that are configured to bring about a brake pressure buildup speed that is significantly greater than in the existing art. Although in such electromechanical brake boosters it is conventionally more difficult to timely limit the forces that occur in the case of a blockage of the brake actuating element, this is possible using the procedure of the present invention. In addition, the present invention makes it possible to keep the risk of injury or damage low as soon as there is a suspicion, using a limitation of the actual motor torque of the corresponding electromechanical brake booster, while at the same time continuing to operate the electromechanical brake booster.

Using the present invention, the conventional redundant sensing for recognizing an already-blocked brake actuating element can be omitted. The conventional redundant sensing is based on a differential path sensor system and an estimated supporting force applied by the electromechanical brake booster through its operation. However, a comparison of the support force with acting spring forces and with a pressure force that is present generally requires the pressure force to be ascertained without a time delay. However, in most cases this is not possible, so that a pressure sensor signal relating to the pressure force is available only with a time delay, which significantly delays a recognition of a blocking of the brake actuating element based on the comparison of the supporting force. This conventional disadvantage can however be circumvented by the present invention.

In an advantageous specific embodiment of the control device, if the sensor signal is outside the specified normal value range, the electronics device is configured to define the maximum limit value for the target quantity taking into account the sensor signal in such a way that the maximum limit value for the target quantity decreases in relation to an increase of a deviation of the differential path from the specified normal value range.

The advantages described above are also ensured in an electromechanical brake booster for a brake system of a vehicle having the corresponding control device, the electromechanical brake booster also being capable of being equipped with the valve body, which is displaceable in a displacement movement in a braking direction by the motor controlled by the control device, and with the input rod, which is attached to the valve body in such a way that the valve body set into the displacement movement in the braking direction is displaceable up to a differential path between the input rod and the valve body that is equal to a specified limit differential path in relation to the input rod, and subsequently the input rod is displaceable by the valve body, set into the displacement movement in the braking direction, in a co-displacement movement as long as at most a retaining force that is below a specified threshold value counteracts the co-displacement movement of the input rod in the braking direction.

At least one buffer element or spring element may be situated on the input rod and/or on the valve body in such a way that if during the displacement movement of the valve body in the braking direction a retaining force above the specified threshold value counteracts the co-displacement movement of the input rod in the braking direction, the differential path between the valve body set into the displacement movement in the braking direction and the input rod can be increased above the specified limit differential path via a distortion of the at least one buffer element or spring element. For example, the at least one buffer element or spring element can include at least one compressive element that is situated on at least one impact surface, capable of being contacted by the input rod, of the valve body, and/or on at least one impact surface, capable of being contacted by the valve body, of the input rod.

A brake system for a vehicle having such a control device or having a corresponding electromechanical brake booster also offers the advantages described above.

In addition, the advantages are also ensured given the carrying out of a corresponding method for operating an electromechanical brake booster of a brake system of a vehicle.

Further features and advantages of the present invention are explained in the following on the basis of the Figures.

BRIEF DESCRIPTION OF THE DRAWINGS

Figure 1 shows a schematic representation of a specific embodiment of the control device and of the electromechanical brake booster equipped therewith.

Figures 2a and 2b show flow diagrams for the explanation of a specific embodiment of the method for operating an electromechanical brake booster of a brake system of a vehicle.

DETAILED DESCRIPTION

Figure 1 shows schematic representations of a specific embodiment of the control device and of the electromechanical brake booster equipped therewith.

Control device 10, shown schematically in Figure 1, or the electromechanical brake booster equipped therewith, are not limited in their use to a particular type of brake system. Moreover, it is to be noted that a brake system equipped with control device 10 or with the corresponding electromechanical brake booster may be used in a large number of different vehicle types/motor vehicle types.

As an example, in the specific embodiment of Figure 1, control device 10 is integrated in the electromechanical brake booster as a control electronics unit. As an alternative to this, however, control device 10 may also be situated externally to the electromechanical brake booster. In both cases, control device 10 (as an advantageous development) can also be configured for the controlling of further components of the brake system equipped with the electromechanical brake booster.

The electromechanical brake booster includes (in addition to control device 10) a valve body 12 and an input rod 14. In the specific embodiment of Figure 1, valve body 12 has a through-going bore having an (annular) expansion. An advantageous attachment of input rod 14 on valve body 12 is realized in that input rod 14 extends at least partly through the bore. In particular, a bonding area of input rod 14 extends into the (annular) expansion. The bonding area of input rod 14 can also be designated an (annular) protrusion on input rod 14, or a key. The advantageous attachment of input rod 14 on valve body 12 can also be described as a mounting of input rod 14 in valve body 12. The bonding/key ensures that the bonding area of input rod 14 can move inside valve body 12 only within certain limits set by the (annular) expansion. Moreover, the electromechanical brake booster shown in Figure 1 also has at least one buffer element and/or spring element 16 situated on input rod 14 and/or on booster body 12, and whose functioning is described in more detail below.

Valve body 12 can be set at least into a displacement movement in a braking direction 18 through the operation of a motor (not shown) of the electromechanical brake booster. This can also be described by saying that valve body 12 is capable of being displaced, by a booster force exerted on the body by the motor, from its (forceless) initial position by a booster path $x_1$ in braking direction 18. For example, in the specific embodiment described here, valve body 12 is connected to the motor, via at least one boost body 20, in such a way that valve body 12 can be set into the displacement movement in braking direction 18 by a movement of booster body 20 brought about by the operation of the motor. As an alternative or supplement to boost body 20, valve body 12 can also be connected to the motor via a threading (not shown).

In the specific embodiment described here, input rod 14 is supported on valve body 12 via a reset spring 22. However, it is to be noted that the equipping of the electromechanical brake booster with reset spring 22 is merely optional. As shown in Figure 1, a brake actuating element 24, such as a brake pedal 24, can be connected or is connected to input rod 14. Through an actuation of brake actuating element 24 by a driver, a driver's braking force can be transmitted to input rod 14. Through the transmitted driver's braking force, input rod 14 can be displaced from its (forceless) initial position by an input rod path $x_2$.

In the depicted specific embodiment, input rod 14 and valve body 12 each contact a first side of a reaction plate 26. An output rod 28 (shown only partially) is situated on a second side, oriented opposite the first side, of reaction plate 26. Output rod 28 is capable of being displaced, by the driver's braking force transmitted thereto via input rod 14 and/or by the booster force of the motor of the electromechanical brake booster, transmitted thereto via valve body 12, in such a way that a master brake cylinder pressure in at least one master brake cylinder situated on the electromechanical brake booster can be increased. Because, however, the usability of the electromechanical brake booster is not limited to a particular type of master brake cylinder working together therewith, the master brake cylinder is not shown in Figure 1. Moreover, it is to be noted that the equipping shown in Figure 1 of the electromechanical brake booster with reaction plate 26 and output rod 28 is to be interpreted only as an example.

Figure 1 shows a schematic representation of the electromechanical brake booster of Figure 1 while the motor is in a deactivated state and while brake actuating element 24 is in its initial position, or while brake actuating element 24 is not being actuated by the driver. This can also be described as saying that the driver's braking force exerted on input rod 14 is equal to zero, and the booster force exerted on valve body 12 is equal to zero.

From the state shown in Fig. 1, the electromechanical brake booster can be activated for an automated/autonomous braking. Automatic/autonomous braking is to be understood as a process in which a brake pressure is built up in at least one wheel brake cylinder of the brake system equipped with the electromechanical brake booster without an actuation of brake actuating element 24 by the driver. For example, the automatic/autonomous braking can be triggered by an automatic speed control system. The automatic speed control system can for example be understood as a driver assistance system (e.g. an ACC or Adaptive Cruise Control system) and/or an emergency braking system (such as an AEB or Autonomous Emergency Braking system). In particular, the electromechanical brake booster can be configured such that a force/energy required to carry out the automatic/autonomous braking can be applied exclusively by the electromechanical brake booster, or by its motor. In this way, it is not necessary to equip the brake system equipped with the electromechanical brake booster with an additional motor device/hydraulic device in order to carry out the automatic/autonomous braking. The multifunctionality of the electromechanical brake booster thus reduces the required constructive space, weight, and production costs of the brake system equipped therewith. Alternatively, however, the electromechanical brake booster can be configured only to boost the automatic/autonomous braking. In this case, the automatic/autonomous braking takes place through an interaction of the electromechanical brake booster with at least one valve of the brake system, at least one transducer device of the brake system such as a motorized plunger device, and/or at least one pump of the brake system.

In order to carry out/boost the automatic/autonomous braking, valve body 12 is set into the displacement movement in braking direction 18 by the operation of the motor. Input rod 14 is attached on valve body 12 in such a way that the valve body 12, displaced (from its initial position) into the displacement movement in braking direction 18 can be displaced up to a differential path d between input rod 14 and valve body 12 that is equal to a limit differential path d0 relative to input rod 14. Differential path d can be understood for example as a differential position of input rod 14 to valve body 12 that can be measured directly in particular by a differential path sensor. (The differential path can for example be defined equal to/via a difference between boost path x1 and input rod path x2, possibly also with a constant.)

As soon as valve body 12 has been displaced by differential path d equal to limit differential path d0, input rod 14 can be set into a co-displacement movement in brake direction 18 by valve body 12 (set into the displacement movement in braking direction 18). The co-displacement movement of input rod 14 in braking direction 18 may be carried out while maintaining differential path d equal to limit differential path d0.

The co-displacement of input rod 14 in braking direction 18 (together with valve body 12) however occurs only if at most a retaining force Fr below a specified threshold value Fr0 counteracts the co-displacement movement of input rod 14 in braking direction 18. In most cases, the co-displacement movement of input rod 14 in braking direction 18 brings about a movement of brake actuating element 24 equal/similar to a corresponding actuation of brake actuating element 24 by the driver. Often, the movement of brake actuating element 24 takes place with a high dynamic characteristic. This is specifically the case when there is an automatic/autonomous full braking.

However, it can happen that at least one object, such as a driver's foot, a bottle, and/or a pet, is situated close to brake actuating element 24. Above all, it is possible that the respective object extends at least partly into an intermediate space between brake actuating element 24 and an adjacent vehicle wall. Such a situation usually causes a force directed against the movement of brake actuating element 24. This also causes a retaining force Fr to act on input rod 14, which counteracts the co-displacement movement of input rod 14 in input direction 18 (together with valve body 12). However, as long as no disturbing object is situated at brake actuating element 24, retaining force Fr acting on input rod 14 will as a rule be below the specified threshold Fr0. (For example, retaining force Fr below specified threshold Fr0 may result from friction of input rod 14.)

However, if an object extends into the intermediate gap between brake actuating element 24 and the adjacent vehicle wall component, then beginning with the presence of light contact between brake actuating element 24 and the respective object, a (slightly) increased retaining force Fr will usually occur. Advantageously, threshold value Fr0 specified at the electromechanical brake booster is defined in such a way that the retaining force Fr, occurring starting from the light contact between brake actuating element 24 and the object, is above the specified threshold value Fr0.

However, due to the equipping of the electromechanical brake booster with control device 10 and the at least one buffer element and/or spring element 16, a clamping, squeezing, or hard impact of the object can be reliably prevented. The at least one buffer element and/or spring element 16 ensures that if during the displacement movement of valve body 12 in braking direction 18 a retaining force Fr slightly exceeding the specified threshold value Fr0 counteracts the co-displacement movement of input rod 14 in braking direction 18, differential path d between valve body 12 set into the displacement movement in input direction 18 and input rod 14 can be increased above the specified limit differential path d0 by a deformation of the at least one buffer element and/or spring element 16. For example, for this purpose the at least one buffer element and/or spring element 16 is configured such that the at least one buffer element and/or spring element 16 is deformable from its respective initial shape, starting with a force applied thereto corresponding to threshold value Fr0, such that differential path d can be increased above the limit differential path d0 via a further displacement of valve body 12 relative to input rod 14. Moreover, the at least one buffer element and/or spring element 16 can be configured such that the at least one buffer element and/or spring element 16 remains in its respective initial shape (approximately) despite a force exerted thereon that corresponds to a retaining force Fr that is below the specified threshold value Fr0. Threshold value Fr0 can easily and reliably be set to a desired value through the design of the at least one buffer element and/or spring element 16. For this purpose, the at least one buffer element and/or spring element 16 merely has to be configured such that it is deformable from its initial shape only starting from a force applied thereto that corresponds to the desired threshold value Fr0, whereas a deformation of the at least one buffer element and/or spring element 16, in its initial shape, is (approximately) prevented when there is a lower force.

The increase, triggered at the electromechanical brake booster, of differential path d above specified limit differential path d0 enables a recognition of risk long before a clamping, squeezing, or hard impact of the object. A light contact between brake actuating element 24 and the object already suffices for an early recognition/determination that a risk situation is present with regard to a possible holding back or blocking of input rod 14 (or of brake actuating element 24). Through the early risk recognition, timely measures can be taken to prevent a clamping, squeezing, or hard impact of the object without immediately terminating the automated/autonomous braking that has begun. For this reason, the use of control device 10 prevents unnecessary terminations of automated/autonomous brakings due to incorrectly overestimated danger situations.

Control device 10 includes an electronics device 32 to which a brake specification 34 can be provided relating to a target vehicle deceleration requested by a driver of the vehicle or by the automatic speed control system of the vehicle. In the following, brake specification signal 34 is understood as a signal of the automatic speed control system of the vehicle by which the automatic speed control system requests an automated/autonomous slowing/braking of the vehicle. Control device 10 is advantageously configured in particular for such situations. Using electronics device 32, taking into account brake specification signal 34 a target quantity can be defined relating to a target motor torque that is to be executed by the motor of the electromechanical brake booster. The target quantity can for example be the target motor torque that is to be carried out and/or a target current strength that is to be provided to the electromechanical brake booster (which as a rule brings about the desired target motor torque). However, it is to be noted that the examples named here of the target quantity are not to be interpreted as limiting. Moreover, at least one control signal 36 can be supplied to the motor of the electromechanical brake booster in such a way that an actual motor torque corresponding to the defined target quantity can be carried out by the controlled motor.

Moreover, electronics device 32 is configured to compare a provided sensor signal 38, relating to the difference path d between valve body 12 displaced by the controlled motor and input rod 14, with a specified normal value range. In particular, the normal value range can be a value range limited by limit differential path d0, so that for example negative differential paths d smaller than negative limit differential path d0 or positive differential paths d greater than positive limit differential path d0 lie outside the specified normal value range.

If provided sensor signal 38 relating to differential path d is outside the specified normal value range, then electronics device 32 is in addition configured to define a maximum limit value for the target quantity from a value range of at least two values for the maximum limit value, taking into account the provided sensor signal 38 relating to differential path d, in such a way that at least during a specified time interval after the defining of the maximum limit value, the target quantity relating to the target motor torque is at most equal to the defined maximum limit value. In this way (at least during the specified time interval after the defining of the maximum limit value), at most an actual motor torque corresponding to the defined maximum limit value can be carried out by the controlled motor of the electromechanical brake booster.

Via the defining of the maximum limit value for the target quantity as a function of sensor signal 38 (or of differential path d), an early reaction can take place even to a suspicion of a blocking (possibly one that is to occur soon) of brake actuating element 24 without immediately interrupting the already-begun automated/autonomous braking for this purpose. Depending on sensor signal 38/differential path d, the maximum limit value for the target quantity can be defined only in such a limiting fashion that an overreaction to the mere suspicion will not occur. In particular, the maximum limit value for the target quantity can decrease in relation to an increase in a deviation of differential path d from the specified normal value range. While in this way when there is a small suspicion of a blocking (possibly occurring soon) of brake actuating element 24, only extreme motor torques of the motor of the electromechanical brake booster are prevented via the defined maximum limit value for the target quantity and relatively large motor torques of the motor below the maximum limit value for the target quantity continue to be used to bring about the automated/autonomous braking, when there is a strong suspicion of the blocking (possibly occurring soon) of brake actuating element 24 only small motor torques of the motor are permitted that are below the (newly defined) maximum limit value for the target quantity. In this way, hard contact between brake actuating element 24 and the object need not be feared.

Via a reduction of the maximum limit value for the target quantity as a function of sensor signal 38/differential path d (or the deviation of differential path d from the specified normal value range), a time up to the actual occurrence of the blocking of brake actuating element 24 can also be prolonged. In this way, additional time is gained for the recognition that the suspicion of a blocking of brake actuating element 24 is justified. This time can be used to carry out further methods for proving the justification of the suspicion and for making a decision about an actual termination of the automated/autonomous braking. Likewise, a removal of the blocking of brake actuating element 24 can be provided by issuing a warning to the driver during this time.

At the same time, in situations in which there is no suspicion of a blocking of brake actuating element 24, high force dynamic characteristics of the motor of the electromechanical brake booster can be used for fast automated/autonomous pressure buildups. Because, using control device 10, it can be recognized already before a blockage of brake actuating element 24 that there is a plausible suspicion of a damage-relevant blockage of brake actuating element 24, high force dynamic characteristics can be carried out comparatively risk-free by the electromechanical brake booster. The electromechanical brake booster can thus be configured to bring about comparatively high forces without danger.

Control device 10 can also be configured to carry out at least some steps of the method described in the following.

In the specific embodiment of Figure 1, the at least one buffer element and/or spring element 16 is at least one compressive element 16 situated on at least one impact surface of valve body 12 that can be contacted by input rod 14. As an alternative or as a supplement thereto, the electromechanical brake booster can also have at least one further compressive element situated on an impact surface of input rod 14 that can be contacted by valve body 12. Likewise, the at least one compressive element 16 on valve body 12 and the at least one further compressive element on input rod 14 can also be situated such that the at least one compressive element adhering on valve body 12 and the at least one further compressive element fastened on input rod 14 can impact one another. For example, in the specific embodiment of Figure 1 the at least one compressive element 16 is made of at least one elastic material such as an elastomer and/or a rubber. The at least one compressive element 16 is thus producible at low cost. At the same time, given such a design of the at least one compressive element 16 threshold value Fr0 can easily be set to a desired value. However, the realization of the at least one compressive element 16 is not limited to a particular elastic material.

Instead of or as a supplement to the realization described above of the at least one buffer element and/or spring element 16, this element can also include at least one (e.g. bonded or enclosed) tensile spring element clamped between input rod 14 and valve body 12. For example, the at least one (bonded or enclosed) tensile spring element can extend from at least one first anchoring point on input rod 14 in the direction towards a side, oriented/capable of being oriented toward the master brake cylinder, of the electromechanical brake booster up to at least one second anchoring point on valve body 12.

Figures 2a and 2b show flow diagrams explaining a specific embodiment of the method for operating an electromechanical brake booster of a brake system of a vehicle.

The method described below can for example be carried out using the control device described above or the electromechanical brake booster equipped therewith. However, it is to be noted that the realization of the method is not limited to a particular type of electromechanical brake booster, brake system equipped therewith, or vehicle.

In a method step S1, a motor of the electromechanical brake booster is operated, for which purpose a target quantity is defined relating to a target motor torque that is to be carried out by a motor of the electromechanical brake booster. An automated/autonomous braking may be carried out by the operation of the motor of the electromechanical brake booster. The determination of the target quantity takes place in this case taking into account a target vehicle deceleration requested by an automatic speed control system of the vehicle. Alternatively, the target quantity can also be defined taking into account a target vehicle deceleration requested by a driver of the vehicle. Moreover, in method step S1 the motor of the electromechanical brake booster is controlled in such a way that the motor is operated with an actual motor torque $M_{act}$ that corresponds to the defined target quantity.

When method step S1 is carried out a valve body of the electromechanical brake booster may be displaced by the operated motor, carrying out a displacement movement in a braking direction relative to an input rod of the brake system until a differential path d between the input rod and the valve body is equal to a specified limit differential path d0. Subsequently, the input rod is set, by the valve body set into the displacement movement in the braking direction, into a co-displacement movement if at most a retaining force below a specified threshold value counteracts the co-displacement movement of the input rod in the braking direction. If, however, during the displacement movement of the valve body in the braking direction a retaining force above the specified threshold value counteracts the co-displacement movement of the input rod in the braking direction, the differential path d between the valve body set into the displacement movement in the braking direction and the input rod is increased above the specified limit differential path d0 via a deformation of at least one buffer element or spring element situated on the input rod and/or on the valve body.

In the method described here, method step S1 is carried out multiple times. In between, a quantity relating to the differential path d between a valve body, displaced by the motor, of the electromechanical brake booster and an input rod is ascertained at least once in a method step S2 (during the controlling of the motor) and is compared with a specified normal value range. This takes place for example by examining whether the (negative) differential path d falls below the specified limit differential path d0.

If the ascertained quantity relating to the differential path d lies outside the specified normal value range, i.e. if the (negative) differential path d falls below limit differential path d0, then a method step S3 is carried out. In method step S3, a maximum limit value for the target quantity is defined. Here, the maximum limit value for the target quantity is defined from a value range of at least two values for the maximum limit value. Here it is expressly noted that the maximum limit value for the target quantity that is defined when there is an ascertained quantity outside the specified normal value range is smaller than a maximum motor torque capable of being carried out by the motor of the electromechanical brake booster, or a corresponding target quantity.

In the specific embodiment of the method described here, method step S3 includes substeps S3a through S3c (Figure 2b). In a substep S3a, an offset value x is defined taking into account the ascertained quantity relating to differential path d. Offset value x can be defined corresponding to a specified (continuous or stepped) function as a function of the ascertained quantity relating to differential path d. In particular, the specified function can decrease (continuously or in stepped fashion) in relation to an increase of a deviation of differential path d from the specified normal value range/limit differential path d0. In a further substep S3b, offset value x is converted into a first motor torque M1. (The maximum limit value for the target quantity, taking into account the ascertained quantity, can thus decrease (continuously or in stepped fashion) in relation to an increase in a deviation of the differential path d from the specified normal value range/limit differential path d0.) Subsequently, in a substep S3c first motor torque M1 is added to current actual motor torque $M_{act}$, and as a result the maximum limit value for the target quantity is obtained.

When method step S1 is carried out again (or in a method step S1'), at least during a specified time interval (after the defining of the maximum limit value) the target quantity relating to the target motor torque is defined to be at most equal to the defined maximum limit value. Correspondingly, it is also ensured that the motor is operated at most with an actual motor torque $M_{act}$ corresponding to the defined maximum limit value.

In the method described here, a permitted increase of actual motor torque $M_{act}$ of the electromechanical brake booster that becomes smaller as the criticality increases is thus calculated as a function of the current differential path d (as known criticality). This permitted increase of actual motor torque $M_{act}$ can however still enable a reliable carrying out of the automated/autonomous braking.